Nov. 29, 1955 W. F. SKILLIN 2,725,236
SCROLL CHUCK
Filed Aug. 7, 1953
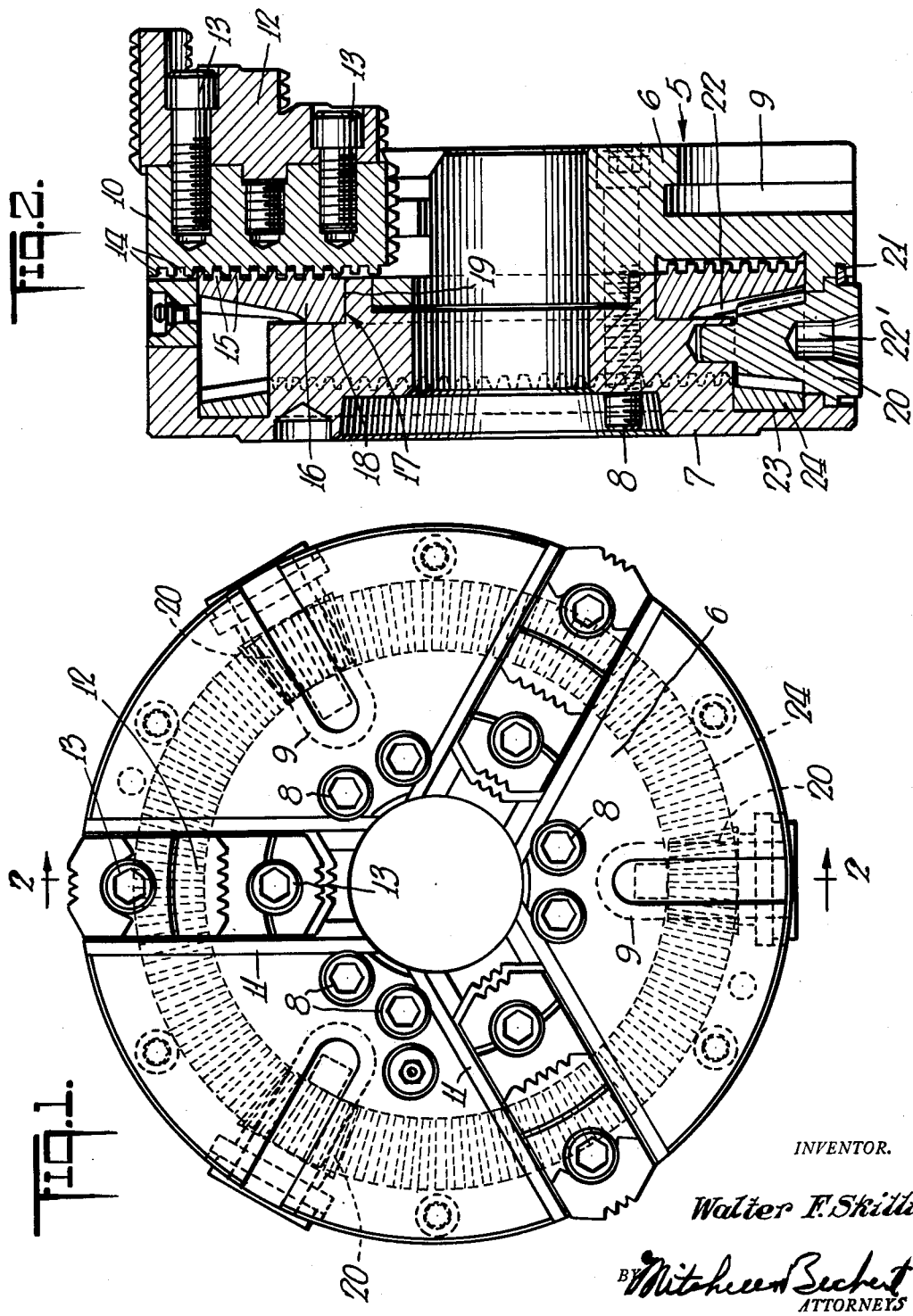
INVENTOR.
Walter F. Skillin
BY Mitchell Bechert
ATTORNEYS

United States Patent Office 2,725,236
Patented Nov. 29, 1955

2,725,236

SCROLL CHUCK

Walter F. Skillin, New Britain, Conn., assignor to Union Manufacturing Company, New Britain, Conn., a corporation of Connecticut Application August 7, 1953, Serial No. 372,890

1 Claim. (Cl. 279—116)

My invention relates to a scroll chuck.

A scroll chuck consists of a body having movable jaws and a scroll plate on the body which is rotatable for moving the jaws. The scroll plate itself is rotated by one of a plurality of generally radial pinions meshing with teeth on the scroll plate. The pinions are spaced circumferentially about the chuck body and each is provided with means to receive a tool for rotating the pinion. Since the scroll plate is a rather large disc-like member, rotatable about the axis of the chuck, it sometimes happens that rotation of the scroll plate by any one single pinion tends to cock and bind the scroll plate and make the operation of chucking or unchucking unduly difficult.

It is an object of my invention to provide a scroll chuck wherein the scroll plate is very readily rotated by any one of a plurality of pinions.

It is another object to provide a scroll chuck wherein the rotating stresses on the scroll plate are more or less balanced.

Another object is to provide a scroll chuck in which rotation of one actuating pinion will automatically cause actuation of a plurality of pinions, all of which are geared to, and assist in, rotation of the scroll plate.

Still another object is to provide a scroll chuck with balancing means to balance some of the forces acting on the scroll plate so as to avoid binding and make chuck actuation easier.

Other objects and various features of novelty and invention will be hereinafter pointed out, or will become apparent to those skilled in the art.

In the drawings, which show for illustrative purposes only, a preferred form of the invention:

Fig. 1 is a view in axial front elevation of a scroll chuck illustrative of the invention;

Fig. 2 is a central, vertical, sectional view of the chuck shown in Fig. 1, taken substantially in the plane of the line 2—2 of Fig. 1.

Briefly stated, in a preferred form of the invention I provide a chuck body with chuck jaws movable thereon and actuatable by a scroll plate mounted for rotative movement on the chuck body. A plurality of pinions are provided for driving or rotating the scroll plate and I provide means for rotating all of the pinions simultaneously so that the pinions, being distributed circumferentially about the scroll plate, will tend to balance or counteract binding forces and permit relatively free rotation of the scroll plate. The means for driving all of the pinions simultaneously may consist of a balancing ring gear meshing with all of the pinions, whereby rotation of any one pinion will not only serve to rotate the scroll plate but also the ring gear and through it the other pinions, so that all of the pinions assist in driving the scroll plate.

In the specific form shown, the scroll chuck comprises a body 5, which is preferably parted along a generally radial plane so as to provide a front section 6 and a rear section or shell 7. These sections normally are secured together, as by means of screws or other fastening devices 8.

The front section, if desired, may have undercut slots 9 therein for the reception of clamping devices or fixtures, as will be understood. A plurality of jaws 10 are movable radially in suitable ways 11 on the body, as is common practice. These jaws 10 may carry false jaws or pads 12 secured thereto, as by means of screws 13. The jaws at the rear are provided with scroll teeth 14 to mesh with the spiral scroll tooth or teeth 15 on the scroll plate 16. Scroll plate 16 is mounted for rotation in a bearing 17 in one of the sections of the chuck body or between the two sections.

The scroll plate, as will be clear, has a radial bearing surface 18 and a circular bearing surface 19, as will be clear. Normally the scroll plate is held in position between the two sections by engagement with the radial bearing surface 18 and engagement with the rear of the chuck jaws or a part of the front chuck body section. Thus, when the body sections are parted, the scroll plate may be removed in an axial direction.

The scroll plate is rotated in the body by means of a plurality of bevel pinions 20—20, in the present instance three, distributed equally circumferentially about the body. These pinions are mounted on generally radial axes and may be held in place as by means of washers or snap rings 21. The teeth of these bevel pinions mesh with teeth 22 formed on the rear of the scroll plate 16. Each of the pinions is provided with means such as an annular opening 22' for the reception of a wrench or other tool for rotating the pinion and thus rotating the scroll plate.

When the scroll plate is rotated by any one single pinion, there are concentrated stresses set up which tend to cock and bind the scroll plate or the jaws or both. My invention relates particularly to means for balancing the stresses on the pinions and the scroll plate, so that the latter will be rotated quite freely without unduly concentrated stresses, and thus the operation or actuation of the chuck will be greatly facilitated.

In the particular form shown, one of the sections of the chuck body, in this case the rear section 7, has a circumferential channel bearing 23 therein for the reception of a balancing ring gear 24 freely rotatably mounted in the channel bearing 23. The ring gear 24 is provided with bevel teeth, just as is the scroll plate for meshing with the teeth of the bevel pinions 20—20. It will be clear that, upon rotation of the balancing ring gear 24 about the axis of the chuck, all of the pinions will be rotated simultaneously, and through the pinions the scroll plate will be rotated by generally equal forces distributed more or less symmetrically about the chuck, thus preventing or largely eliminating the binding forces heretofore sometimes encountered in scroll chucks. In the particular form of the invention illustrated, the balancing ring gear 24 is rotated by one of the bevel pinions 20, so that that particular bevel pinion will itself tend to rotate the scroll plate and will at the same time tend to rotate the balancing ring gear 24. As indicated, rotation of the ring gear 24 will rotate the other pinions, which in turn will tend to rotate the scroll plate, whereby the rotating forces are symmetrically distributed and any tendency of the scroll plate to cock or bind will be largely eliminated.

It will be clear then, in the preferred form, that any one of the plurality of pinions may be actuated and actuation of any one will cause simultaneous actuation of all of the others, so as to operate the chuck with the least possibility of binding.

The parts may all be readily assembled. It will be clear that the scroll plate is normally held in place between the two sections, as heretofore indicated, and the balancing ring gear 24 is preferably held in place in its channel bearing 23 by means of the bevel pinions 20 themselves. Therefore, by the simple means disclosed, I have provided a scroll chuck which will operate quite freely and binding will be largely eliminated.

While the invention has been described in considerable detail and a preferred form illustrated, it will be understood that various changes and modifications may be made within the scope of the invention, as defined in the appended claim.

I claim:

In a scroll chuck, a chuck body comprising a front section and a rear section secured together, said rear section having an annular groove therein, a balancing ring gear mounted for rotation in said groove, a plurality of bevel pinions mounted radially of said body and meshing with said balancing ring gear, said rear section having an upstanding annular wall and a radially extending axially facing bearing surface radially inwardly of said annular groove, an annular scroll plate resting axially on said bearing surface and located radially by said upstanding annular wall, said scroll plate extending radially outwardly to overstand said annular groove and having teeth to mesh with the teeth of said bevel pinions, said front section having guideways and radially movable jaws in said guideways, said scroll plate and jaws having coacting scroll surfaces to move said jaws upon actuation of said scroll plate, said front section when assembled with said rear section serving to hold said scroll plate and pinions in place.

References Cited in the file of this patent

UNITED STATES PATENTS

| | | |
|---|---|---|
| 1,181,845 | Church | May 2, 1916 |
| 1,845,226 | Bogart | Feb. 16, 1932 |
| 2,213,653 | Lisbon | Sept. 3, 1940 |